United States Patent [19]

Bando et al.

[11] Patent Number: 4,939,363
[45] Date of Patent: Jul. 3, 1990

[54] SCANNING TUNNELING MICROSCOPE

[75] Inventors: Hiroshi Bando, Tsukuba; Akira Sakai, Kawasaki, both of Japan

[73] Assignees: Director General of Agency of Industrial Science and Technology, Tokyo; Kabushiki Kaisha Toshiba, Kawasaki, both of Japan

[21] Appl. No.: 370,819

[22] Filed: Jun. 23, 1989

[30] Foreign Application Priority Data

Jun. 23, 1988 [JP] Japan ................................. 63-153487

[51] Int. Cl.$^5$ ............................................. H01J 37/26
[52] U.S. Cl. ..................................... 250/306; 250/307; 250/310; 250/311; 250/442.1
[58] Field of Search ................ 250/306, 307, 310, 311, 250/442.1, 423 F

[56] References Cited

U.S. PATENT DOCUMENTS

| | | | |
|---|---|---|---|
| 4,760,254 | 7/1988 | Pierce et al. | 250/306 |
| 4,800,274 | 1/1989 | Hansma et al. | 250/306 |
| 4,814,622 | 3/1989 | Gregory et al. | 250/423 F |
| 4,823,004 | 4/1989 | Kaiser et al. | 250/307 |
| 4,837,445 | 6/1989 | Nishioka et al. | 250/442.1 |
| 4,861,990 | 8/1989 | Coley | 250/306 |
| 4,870,352 | 9/1989 | Koechner | 250/310 |
| 4,874,945 | 10/1989 | Ohi | 250/306 |

OTHER PUBLICATIONS

Patent Abstracts of Japan, unexamined applications, P field, vol. 12, No. 90, Mar. 24, 1988, The Patent Office Japanese Government, p. 51, p. 679, * Kokai-no. 62-223 602 (Hitachi).
Helvetia Physica Acta, vol. 55, 1982, Binnig et al.: "Scanning Tunneling Microscopy", pp. 726–735; * Chapters 2, 3 *.

Primary Examiner—Janice A. Howell
Assistant Examiner—Kiet T. Nguyen
Attorney, Agent, or Firm—Oblon, Spivak, McClelland, Maier & Neustadt

[57] ABSTRACT

A scanning tunneling microscope according to the present invention comprises a tip for emitting spin-polarized electrons and a magnet for applying a magnetic field to this tip. This tip is constituted of a metal needle made of a tungsten and an EuS layer about 400 Å which is coated on the surface of the metal needle. This tip is brought to such a close distance to the surface of the specimen that tunnel current flows. A magnetic field is applied to the axial direction of the tip a bias voltage is applied between the tip and the specimen and the tip is made to scan the surface of the specimen. The tip having a magnetic field applied to the axial direction thereof emits only spin-polarized electrons with the electron spins oriented in the axial direction. The spin-polarized electrons flows only in the area at the surface of the specimen where empty states for the electrons having spins in the parallel direction are distributed. By detecting the flow of the electrons, that is, the tunnel current, it is possible to obtain the distribution of the electrons having downward or downward spins. The shape of the pointed end of the tip is almost the same as that of a tip used in an ordinary STM. This makes it possible to measure the distribution of the electron spins with an atomic scale resolution.

8 Claims, 3 Drawing Sheets

SCANNING TUNNELING MICROSCOPE

BACKGROUND OF THE INVENTION

1. Field of the Invention

This invention relates to a scanning tunneling microscope and more specifically to an improved scanning tunneling microscope for investigating magnetic properties of the surface of a specimen.

2. Description of the Related Art

With the progress of thin film deposition technology, particularly with the remarkable progress in MBE (molecular beam epitaxial process) and CVD (chemical vapor deposition process), it has become possible to form a magnetic film several nanometers thick and these processes show great promises for use in various fields. The magnetic properties of a film with thickness of one to several atomic layers are not necessarily identical with those of bulk material. Therefore, it is necessary to measure the magnetic properties of the individual magnetic films. The same thing can be said of surface magnetism. In other words, the surface of a magnetic substance shows magnetic properties different from those of the bulk.

For measurement of surface magnetism, there is a requirement that the method used should be sensitive both to surface and the electron spins. In this application the surface magnetism is used in a wide sense which includes both surface properties of magnetic material and the magnetism of thin films. Among the conventional technologies that can meet the above-mentioned requirement are the polarized photoelectron spectroscopy and polarized LEED (low energy electron diffraction). These methods are well known and there have been some study results obtained by use of these methods. Nevertheless, there remain problems yet to be solved.

To mention some of the problems, both the polarized photoelectron spectroscopy and the polarized LEED have low spatial resolution. Information that can be obtained through measurement by the polarized photoelectron spectroscopy and the polarized LEED is confined to the average properties in the range of several tens of nanometer at most. However, in many of important magnetic substances, electron spins are localized. For this reason, it is very important to observe the distribution of electron spins on an atomic-scale spatial resolution.

All of the above-mentioned technologies require a large-scale setup and considerable cost. The polarized LEED requires a GaAs polarized electron source. This GaAs polarized electron source is of great size that utilizes optical pumping by the laser. The polarized photoelectron spectroscopy, on the other hand, uses a Mott detector. This Mott detector is a large-size detector having an electrostatic accelerator at the preceding stage.

Meanwhile, in contrast with these technologies, a scanning tunneling microscope (STM) which has recently been developed is an apparatus that permits observation of the surface of a specimen on the atomic scale. When a metal tip is brought as close as about 1 nm to the specimen surface and a bias voltage is applied across the specimen and the tip a tunnel current flows between the specimen surface and the tip The STM is an apparatus for measuring the corrugation of the surface of the specimen by utilizing a phenomenon that the tunnel current changes in response to even slight changes in the distance between the tip and the specimen. With the STM, by a voltage applied between the tip and the specimen, it is possible to observe how surface electrons possessing a specific level of energy are distributed in the space. To take GaAs for example, the electrons of GaAs are mostly localized in As atoms. The STM is capable of discriminatingly imaging the state where electrons are localized in As atoms and the state where there is no electron in Ga atoms. However, from measurement by the conventional STM, it is impossible to obtain information as to electron spins.

As is clear from the foregoing, measuring technologies which are sensitive to the electron spins are inferior in spatial resolution. And, the STM superior in spatial resolution is unable to measure the distribution of electron spins.

SUMMARY OF THE INVENTION

The object of this invention is to provide a scanning tunneling microscope for measuring the distribution of electron spins with a high spatial resolution in the order of about 1 nm or less.

In order to achieve the above object, an improved scanning tunneling microscope for investigating the magnetic properties at the surface of a specimen according to the present invention comprises a tip located above the surface of the specimen, means for applying to the tip a magnetic field extending in the axial direction of the tip electron emission means for emitting spin-polarized electrons, means for bringing the tip to a tunneling distance from the surface of a specimen and letting the tip scan the surface, means for applying a specified bias voltage across the tip and the specimen and means for detecting a tunnel current flowing between the tip and the specimen.

The tip emits only the spin-polarized electrons which have the spins oriented in one direction. The spin-polarized electrons emitted from the tip flow at the surface of the specimen only in the area (or areas) where there are empty states for electrons having spins in the parallel direction. This flow of the spin-polarized electrons is observed as a tunnel current. Therefore, by letting the tip scan the surface of a specimen to detect a tunnel current, the distribution of electrons with spins in one direction and in the opposite direction, at the specimen surface, can be measured separately.

DETAILED DESCRIPTION OF THE PREFERRED EMBODIMENT

A preferred embodiment of this invention will now be described with reference to the accompanying drawings.

Figure 1:
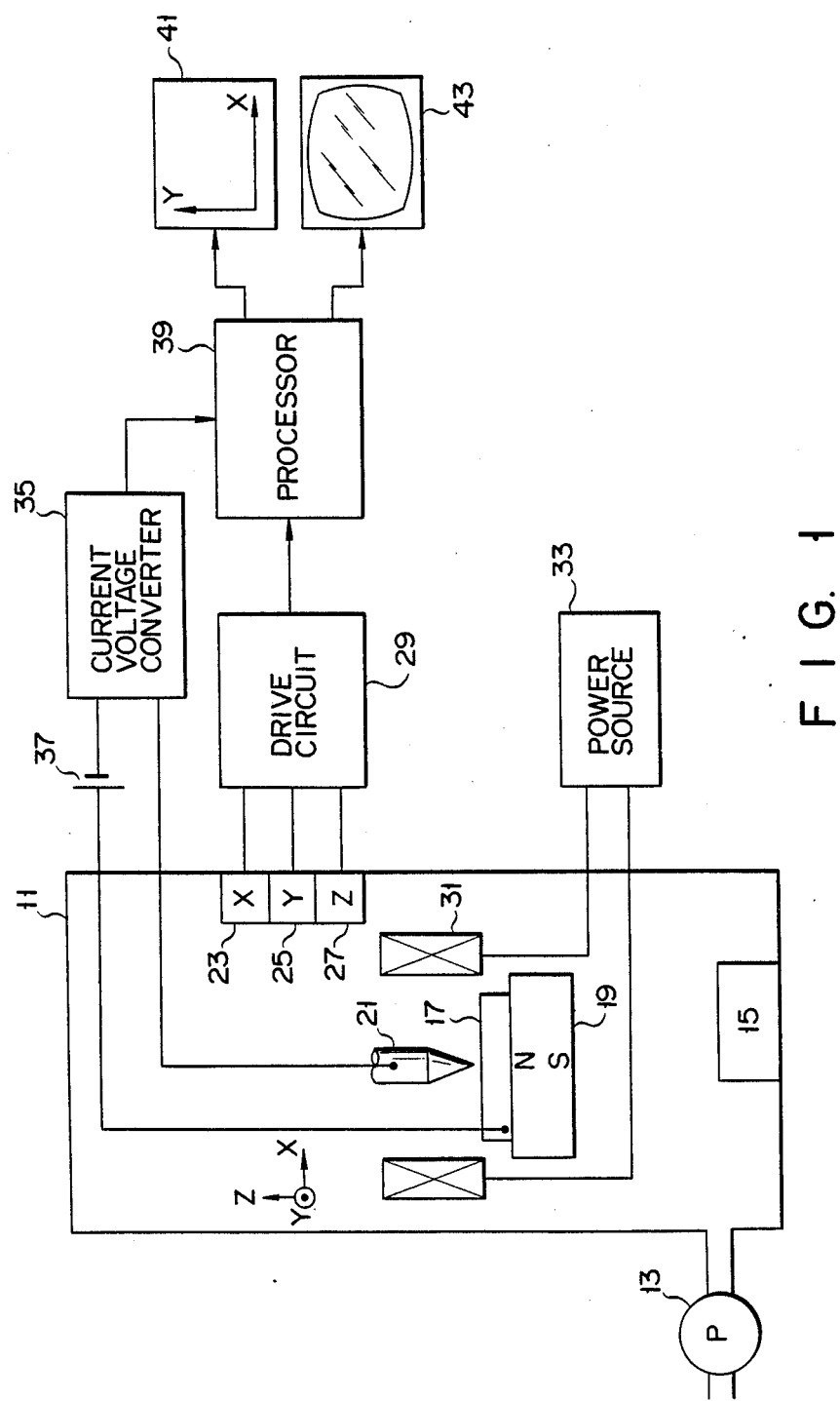
FIG. 1 is a block diagram schematically showing an embodiment a scanning tunneling microscope according to this invention.

A block diagram of the preferred embodiment of this invention is shown in FIG. 1. Vacuum chamber 11 is connected to vacuum pump 13 which evacuates vacuum chamber 11 to $10^{-10}$ Torr or less. Vacuum chamber 11 is provided with low-temperature source 15 which cools vacuum chamber 11 to liquid helium temperature.

Specimen 17 is mounted on magnet 19 which directs the electron spins of the specimen perpendicularly to the surface of the specimen. Magnet 19 is provided as necessity requires. Above specimen 17, tip 21 is supported which emits spin-polarized electrons. Tip 21 is fixed to an actuator constituted of piezo elements 23, 25 and 27 which can be displaced in the X, Y and Z directions, respectively. Piezo elements 23, 25 and 27 are connected to drive circuit 29 which supplies specified voltages to the electrodes of piezo elements 23, 25 and 27. Thus, tip 21 is made to scan the surface of specimen 17 by piezo elements 23 and 25 and tip 21 is made to move perpendicularly to the surface of specimen 17 by piezo element 27.

Provided surrounding tip 21 is magnet 31 which applies to the tip a magnetic field in the direction of the tip. Magnet 31, constituted of a coil, is connected to power source 33. By changing the direction of a current supplied from power source 33 to the coil, the direction of the magnetic field applied to tip 21 can be changed. The spins of the electrons emitted from tip 21 are arranged along the axis of the tip by the magnetic field applied.

Tip 21 is connected to current-voltage converter 35. Specimen 17 is also connected through power source 37 to current-voltage converter 35 in such a way that specimen 17 is at a positive potential. Current-voltage converter 35 converts a tunnel current flowing between tip 21 and specimen 17 into a voltage signal. Current-voltage converter 35 is connected to processor 39, to which voltage signal corresponding to data of tunnel current is supplied from current-voltage converter 35. Drive circuit 29 is connected to processor 39, to which positional signal corresponding to a position of tip 21 on specimen 17 is inputted. Processor 39, including a memory, stores data of tunnel current related with positional signal and processes data by specified arithmetic operations to convert it into display data. Processor 39 is connected to monitor 43 which displays a surface condition of specimen 17 on the screen in accordance with display data and also to X-Y plotter 41 which records measurement results.

Figure 2:
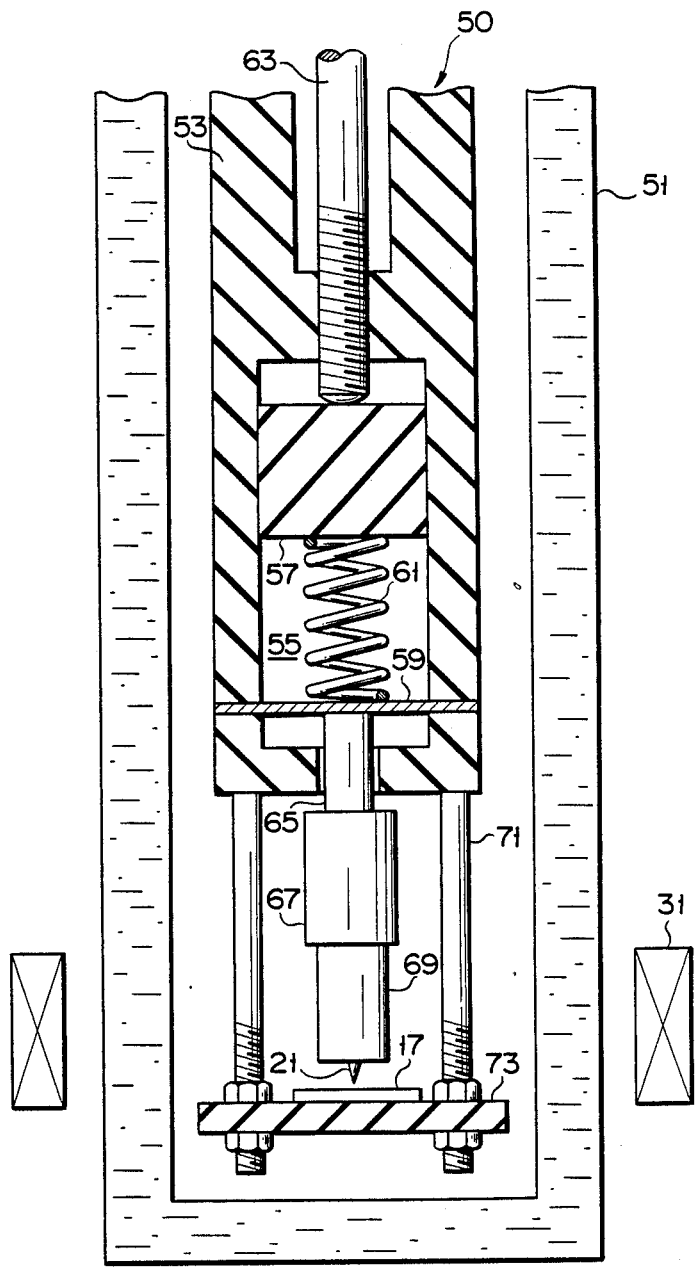
FIG. 2 is a schematic cross sectional view showing the main section of the scanning tunneling microscope shown in FIG. 1.

Main section 50 of the apparatus is supported in cryostat 51 filled with liquid helium and is cooled to liquid helium temperature. FIG. 2 is a schematic diagram of the main section of the apparatus. Main body 53 of main section 50 of the apparatus has cylindrical, hollow working chamber 55. In the working chamber, piston 57, which is movable vertically, is supported by coil spring 61. Coil spring 61 is mounted on plate spring 59 fixed to the side wall defining working chamber 55.

A first threaded hole is provided in the middle of the upper wall defining working chamber 55. Setscrew 63 is driven into this threaded hole and is in contact at its end with piston 57. A second through-hole is also provided in the middle of the bottom wall defining working chamber 55. Support member 65 fixed to the underside of plate spring 59 passes through the second through-hole and extends out of working chamber 55. Piezo element unit 67 of is laminated structure is attached to the lower end of support member 65 and tubular piezo element 69 is attached to the lower end of laminated piezo element 67. Tip 21 for emitting spin-polarized electrons is located in the middle of cylindercal piezo element 69 and extends along substantially vertical direction from the lower end of piezo element 69.

A plurality of metal support rods 71, extending downwardly, are mounted to the underside of main body 50. Each of metal support rods 71 have threaded section at its lower end and the threaded sections are inserted into holes of specimen table 73. Specimen table 73 is held with two nuts fitted on the threaded sections and by mainpulating these nuts, the vertical position of specimen table 73 is adjusted. Specimen 17 placed on specimen table 73 is located at a specified distance from tip 21 in such a way that the surface to be examined is substantially perpendicular to tip 21. In specimen table 73, a magnet 19 is disposed, for applying to specimen 17 a magnetic field perpendicular to its surface to be examined.

Magnet 31 for applying a magnetic field to tip 21 is attached to support rods 71 or provided around the outer periphery of cryostat 51 and at about the same height as the tip.

The coarse approach of tip 21 to the specimen surface is accomplished by setscrew 63, piston 57, coil spring 61 and plate spring 59. When setscrew 63 is turned and driven in the first hole, a force is applied to piston 57 and it moves downwards. The force applied to piston 57 is transmitted through coil spring 61 to plate spring 59, which is thereby deformed downwards. In other words, the movement of piston 57 is reduced in amount when it is transmitted to plate spring 59. As plate spring 59 is deformed, support member 65 fixed to plate spring 59, piezo element unit 67 and tubular piezo element 69 are moved in one body. Thus, tip 21 is brought as close as several microns to the surface of specimen 17.

Tip 21 located at several microns from the surface of specimen 17 is further lowered by stacked piezo element unit 67 to a distance at which a tunnel current flows between tip 21 and specimen 19. Then, tip 21 can be made to scan the surface of specimen 17 by tubular piezo element 69.

Figure 3:
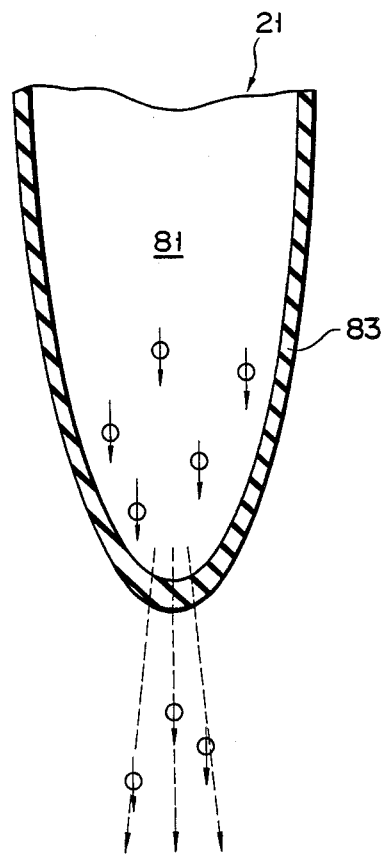
FIG. 3 is a schematic diagram, on an enlarged scale, showing the tip shown in FIG. 2.

By referring to FIG. 3, the tip will be described in detail. Tip 21 is constituted of tungsten needle 81 having a sharp pointed end with a radius of curvature of 1 $\mu$m or less and EuS (europium sulfide) layer 83 about 400 Å thick, which is vapor-deposited on the surface of tungsten needle 81. EuS layer 83 deposited on the surface of needle 81 becomes ferromagnetic at 17K or below. At ferromagnetic state, the height of the energy barrier at the interface between W and EuS is determined depending on the direction of the spins. Therefore, when a specified electric field (0.1 V/Å) is applied to tip 21, only those electrons having spins directed in one direction pass through EuS layer 83 and are emitted from tip 21. In this way, EuS layer 83 serves as a spin filter for the electrons from the tungsten needle. More than 90% of the spins of the electrons emitted from tip 21 are polarized at liquid helium temperature.

Then, referring to FIGS. 1 through 3, measuring operation will be described. To find the distribution of the spins of the electrons at the surface of a specimen. In a first measurement step, tunnel current is measured, when a magnetic field generated in the Z direction is applied to the tip and the tip scan the specimen surface. In a second measurement step tunnel current is measured, when a magnetic field generated in the $-Z$ direction is applied to the tip and the tip scan the specimen surface. The measured tunnel currents obtained in the first and second steps are compared by processor 39.

Description will first be made of measurement in which a magnetic field in the $-Z$ direction is applied to tip 21. Prior to measurement, vacuum chamber 11 is cooled to liquid helium temperature. Several volts are applied between tip 21 and specimen 17 from power source 37. Tip 21 is brought as close as several microns to the surface of specimen 17 by turning setscrew 63. Then, specified voltages are applied to stacked piezo element unit 67 from drive circuit 29 and tip 21 is brought to such a close distance, i.e., tunnel distance, from the surface of specimen 17 that tunnel current flows. In addition, a magnetic field in the $-Z$ direction is applied to tip 21 by magnet 31. As mentioned above, the energy barrier at the interface between the tungsten portion and the EuS layer differs for the electron spins in different directions. Therefore, only the electrons whose spins are directed in one direction are emitted from tip 21. FIG. 3 shows that the electrons having spins in the $-Z$ direction are being emitted.

When a specified voltage is applied to tubular piezo element 69 by drive circuit 29, tip 21 scans the surface of specimen 17 while tip 21 keeps the tunnel distance from the surface. During scanning, electrons flow from tip 21 to the surface of specimen 17 only in the area (or areas) where there are empty states for electrons whose spins are in the parallel direction to the spins of the electrons emitted from tip 21. More specifically, as shown in FIG. 3, when the electrons from tip 21 are polarized in the $-Z$ direction, tunnel current flows between tip 21 and specimen 17 only in the area (or areas) of the surface of specimen 17 where empty states for electrons having the spins in the $-Z$ direction are locally concentrated. The tunnel current is converted into a voltage signal by current-voltage converter 35 and this voltage signal is inputted into processor 39. At the same time, positional signals representing the scanning position of tip 21 are inputted from drive circuit 29 to processor 39. Voltage signals representing the magnitude of tunnel current and positional signals representing the position of tip 21 are converted by processor 39 into three-dimensional image signals or display signals which are outputted to monitor 43 for image display. Also, the image signals are sent to X-Y plotter 41 to record data on a specified sheet. In this way, it is possible to find changes in tunnel current when a magnetic field in the $-Z$ direction is applied to tip 21 and the tip is made to scan the surface of the specimen.

Then, a magnetic field in the opposite direction is applied to tip 21 and measurement is carried out in the same manner as above. The direction of a magnetic field applied to tip 21 can be reversed by switching over of power source 33 to change the direction of current flowing in magnet 31. Then, the electrons having spins polarized in the Z direction are emitted from tip 21. Under this condition, tip 21 is made to scan along the same lines as in the previous measurement on the surface of specimen 17 and tunnel current flowing between tip 21 and specimen 17 is measured.

Any measurement results thus obtained include the effects of the corrugation of the surface of specimen 17. To be more specific, as tunnel current depends on the distance between tip 21 and specimen 17, tunnel current varies significantly in accordance with the corrugation of the surface of specimen 17 when scanning is done by tip 21 kept at a constant height. Description will next be made of the method subtracting the current variation due to the corrugation of the surface of specimen 17, which is proportional to density of empty states for electrons having upward (Z direction) in usual magnetic specimens.

Denoting the scanning position of tip 21 at the surface of specimen 17 by r, the distance d between tip 21 and specimen 17 can be expressed as d(r), in which d is a function of r. If the flowing rate at which tunnel current flows is denoted by f, since f depends on d(r), f can be expressed as f(d(r)). The current $I_+(r)$ of the electrons with upward (Z direction) spins is given by $$I_+(r) = A \cdot f(d(r)) \cdot n_-(r) \quad (1)$$

where A is a constant which does not depends on r and $n_-(r)$ is the distribution of the electrons having downward ($-Z$ direction) spins at the surface of specimen 17.

On the other hand, the current $I_-(r)$ of the electrons having downward ($-Z$ direction) spins is given as follows.

$$I_-(r) = A \cdot f(d(r)) \cdot n_+(r) \quad (2)$$

where n (r) is the distribution of the electrons having upward (Z direction) spins at the surface of specimen 17.

Two results obtained by the above measurement are $I_+(r)$ and $I_-(r)$. From the measurement of $I_+(r)$ (or $I_-(r)$) alone, it is impossible to decide whether the dependence on r of $I_+(r)$ (or $I_-(r)$) is due to the spin distribution $n_-(r)$ (or $n_+(r)$) or the corrugation d(r) of the surface of the specimen. However, by calculating $(I_+(r)-I_-(r))/(I_+(r)+I_-(r))$, wherein A and f (d(r)) are cancelled, we have $$(I_+ - I_-)/(I_+ + I_-) = (n_- - n_+)/(n_- + n_+) \quad (3)$$
$$= M(r)/n$$

where $M \equiv n_- - n_+$ is the magnetization of the surface of the specimen and $n \equiv n_- + n_+$ is the distribution of all electrons. This is nothing other than the distribution of the spins. That is to say, by substituting the above-mentioned experimented results into Eq. (3), the distribution of the spins can be obtained. The calculation described above can be carried out in processor 39.

In the above measurement, after scanning by the electrons with downward spins, scanning by the electrons with upward spins is performed. However, it is possible to measure the current $I_+$ of the electrons with upward spins and the current $I_-$ of the electrons with downward spins in one-time scanning by reversing the direction of the electric field applied to tip 21 at every measuring point on the surface of the specimen.

The spatial resolution of this apparatus depends basically on the shape of the tip and the distance between the tip and the specimen. In this embodiment, when 2 volts are applied between the tip and the specimen, if the distance between the tip and the speci-men is 20 Å or less, the EuS layer serves as a spin filter. In this case, when the effective radius of the curvature of the tip apex is 10 Å, the spatial resolution becomes 8 Å.

According to this invention, the distribution of the electron spins at the surface of a specimen can be measured with an extremely high spatial resolution on the order of several angstroms. Therefore, it is possible by this apparatus to measure the magnetic properties of various types of magnetic substances with an atomic scale. Further, contrary to the polarized photoelectron spectroscopy and the polarized LEED method, the method according to this invention has an advantage that a big instrument and a large-scale detector are not required.

This invention is not limited to the above embodiment. For example, the tip is not limited to one which is constituted of a tungsten needle coated with europium sulfide. Any type of tip can be used so long as it emits electrons whose spins are oriented parallel or antiparallel to the applied magnetic field. To be more concrete, instead of tungsten, any type of metal or alloy can be used as a tip such as nickel that permits machining into a needle shape. The coating material of the metal needle is not limited to europium Sulfide and any material that can serves as a spin filter can be used. For general applications, it is possible to use a material which becomes a ferromagnetic insulater at a specific temperature. The scanning mechanism of the tip is limited at all to the one shown in FIG. 2 and can be made in a suitable form according to the specified conditions. Obviously, many other modifications and variations of this invention are possible without departing from the spirit and scope of the invention.

What is claimed is:

1. A scanning tunneling microscope for investigating the distribution of the electron spins at the surface of a specimen, comprising:
   a tip disposed above the surface of the specimen;
   means for emitting electrons whose spins are polarized in one direction;
   means for supporting said tip at a specified distance from the surface of the specimen and letting said tip scan the surface of the specimen;
   means for applying a specified voltage between the tip and the specimen and causing a tunnel current to flow between said tip and the specimen;
   means for detecting the tunnel current; and
   means for forming and displaying an image according the tunnel current detected.

2. The scanning tunneling microscope according to claim 1, wherein said tip is constituted of a tungsten needle coated with europium sulfide.

3. The scanning tunneling microscope according to claim 1, further comprising means for applying a magnetic field to the specimen such that the magnetic field is normal to the surface of the specimen.

4. The scanning tunneling microscope according to claim 1, further comprising means for cooling said tip and the specimen to a specified temperature.

5. The scanning tunneling microscope according to claim 4, wherein said cooling means includes a vessel having a hollow section in which said tip and the specimen are accommodated and a liquid storage section provided around said hollow section, and liquid helium stored in said liquid storage section.

6. The scanning tunneling microscope according to claim 1, wherein said emitting means selectively applies a magnetic field in one direction or in the opposite direction to said tip and polarizes the spins of the electrons, emitted from said tip in one direction or in the opposite direction.

7. The scanning tunneling microscope according to claim 6, wherein said display means includes a first tunnel current $I_+$ by the electrons whose spins are polarized in one direction and a second tunnel current $I_-$ by the electrons whose spins are polarized in the opposite direction, and means for calculating $(I_+ - I_-)/(I_+ + I_-)$ which represents the spin distribution from the first tunnel current and the second tunnel current.

8. The scanning tunneling microscope according to claim 7, wherein said moving means has means for outputting positional signals corresponding to the position of said tip and said display means has means for outputting $(I_+ - I_-)/(I_+ + I_-)$ in accordance with the positional signals.

* * * * *